(12) United States Patent
Holstrom

(10) Patent No.: US 8,572,901 B2
(45) Date of Patent: Nov. 5, 2013

(54) COMPOST COVER TIE-DOWN SYSTEM

(75) Inventor: Thomas A. Holstrom, Salt Lake City, UT (US)

(73) Assignee: Thomas A. Holstrom, Salt Lake City, UT (US)

( * ) Notice: Subject to any disclaimer, the term of this patent is extended or adjusted under 35 U.S.C. 154(b) by 169 days.

(21) Appl. No.: 13/011,742

(22) Filed: Jan. 21, 2011

(65) Prior Publication Data
US 2012/0186620 A1   Jul. 26, 2012

(51) Int. Cl.
B09B 5/00 (2006.01)
B09B 1/00 (2006.01)
E02D 31/00 (2006.01)
E04H 15/64 (2006.01)

(52) U.S. Cl.
USPC ............... 52/23; 52/3; 52/4; 52/83; 135/119; 135/120.4; 405/129.45

(58) Field of Classification Search
USPC ............ 52/3, 4, 23, 83; 135/119, 120.4, 908; 405/129.45, 129.75, 129.8, 129.9, 405/129.95
See application file for complete search history.

(56) References Cited

U.S. PATENT DOCUMENTS

| | | | |
|---|---|---|---|
| 1,106,624 A * | 8/1914 | Cadwallader et al. | 47/22.1 |
| 2,251,624 A * | 8/1941 | Foree et al. | 47/29.6 |
| 2,964,759 A * | 12/1960 | Riggs | 4/498 |
| 3,116,746 A * | 1/1964 | Bird | 52/2.23 |
| 3,534,511 A * | 10/1970 | Cappella | 52/63 |
| 3,872,634 A * | 3/1975 | Seaman | 52/222 |
| 4,008,730 A * | 2/1977 | Keklak et al. | 135/90 |
| 4,257,199 A * | 3/1981 | Kuboyama | 52/2.17 |
| 4,413,029 A * | 11/1983 | Handwerker | 428/61 |
| 4,454,807 A * | 6/1984 | Wolstenholme | 99/646 S |
| 4,455,790 A * | 6/1984 | Curle | 52/4 |
| 4,478,012 A * | 10/1984 | Fraioli | 52/2.25 |
| 4,493,248 A * | 1/1985 | Wolstenholme | 454/182 |
| RE32,536 E * | 11/1987 | Wolstenholme | 99/646 S |
| 4,897,970 A * | 2/1990 | Double et al. | 52/4 |
| 4,927,317 A * | 5/1990 | Acosta | 414/724 |
| 5,206,964 A * | 5/1993 | Wilson, Sr. | 5/417 |
| 5,291,698 A * | 3/1994 | Rayner, Jr. | 52/3 |
| 5,427,491 A * | 6/1995 | Duffy et al. | 414/291 |
| 5,470,177 A * | 11/1995 | Hughes | 405/115 |
| 5,738,160 A * | 4/1998 | Rice | 160/84.06 |
| 6,474,022 B1 * | 11/2002 | Double et al. | 52/3 |
| 7,325,558 B2 * | 2/2008 | Weeks | 135/96 |
| 7,887,117 B2 * | 2/2011 | Pivetta | 296/100.13 |
| 8,052,349 B2 * | 11/2011 | Lacey | 405/129.95 |
| 8,079,778 B2 * | 12/2011 | Colkitt | 404/100 |
| 8,141,323 B2 * | 3/2012 | McGary | 52/745.01 |

(Continued)

Primary Examiner — Brian Glessner
Assistant Examiner — Rodney Mintz
(74) Attorney, Agent, or Firm — Maschoff Brennan

(57) ABSTRACT

Compost cover tie-down systems for securing a compost cover using a perimeter element, struts and lashes are disclosed, wherein the lashes apply force to the struts which thereby apply a force to the perimeter element to aid in securing a compost cover. Configurations of struts for use with compost cover tie-down systems are also disclosed, which include perimeter engagement portions and lash engagement portions. Multiple configurations of the systems, struts, and lashes as well as methods of using the same are also disclosed.

8 Claims, 8 Drawing Sheets

(56) References Cited

U.S. PATENT DOCUMENTS

| | | | |
|---|---|---|---|
| 8,205,393 B1* | 6/2012 | Harrop et al. | 52/3 |
| 8,375,643 B1* | 2/2013 | Harrop et al. | 52/3 |
| 2002/0166289 A1* | 11/2002 | Oviedo-Reyes | 52/4 |
| 2004/0107985 A1* | 6/2004 | Weeks | 135/908 |
| 2006/0150537 A1* | 7/2006 | Baum et al. | 52/90.1 |
| 2007/0266644 A1* | 11/2007 | Weicht | 52/3 |
| 2008/0141596 A1* | 6/2008 | Kelly et al. | 52/23 |
| 2008/0296186 A1* | 12/2008 | Daun et al. | 206/338 |
| 2009/0013610 A1* | 1/2009 | Glynos | 52/3 |
| 2009/0322116 A1* | 12/2009 | Pivetta | 296/100.12 |
| 2010/0047020 A1* | 2/2010 | Lacey | 405/129.9 |

\* cited by examiner

COMPOST COVER TIE-DOWN SYSTEM

CROSS-REFERENCE TO RELATED APPLICATIONS

Not applicable.

BACKGROUND OF THE INVENTION

1. The Field of the Invention

This disclosure describes apparatus, means, and systems for tying down a cover for a compost pile. The disclosure also describes methods of using the described apparatus, means, and systems for tying down a cover for a compost pile.

2. The Relevant Technology

Composting of feedstock waste materials is gaining popularity on a global scale to minimize waste products going to landfills, reduce green house gas emissions from uncontrolled decomposition of organics, and to create useable compost end-products which are used to restore nutrients, tilth, and water-holding capacity to depleted soils. Common waste feedstock materials include green wastes, food wastes, and animal manures. The composting process produces foul odors as the biodegradation of the wastes proceeds, which prompts many compost operators to either locate their operations in locations remote from populated areas or to enclose their operations to capture and treat the odor emissions.

Building enclosures have been employed, but are expensive to construct and require air exchange and external "scrubbing" facilities to remove odors. The advent of selectively porous laminate textile fabrics (such as the trademarked GORETEX fabric) has offered an alternative for covering compost piles that effectively sequesters the large-molecule odorous compounds beneath the cover while allowing oxygen and $CO_2$ exchange, which is vital to the composting process. The covers provide a cost-effective alternative to construction of building enclosures and separate odor treatment systems, allowing for composting nearer to population centers where the feedstock wastes are generated.

Fabric covers are deployed over large compost windrows (typically 100-150 feet in length, 20-30 feet in width, and 6-12 feet in height) which overlie aeration plenums that extend beneath the windrow length and provide pumped air (e.g., via blower) up and through the windrow. The air supply provides oxygen, which is critical to the composting process, and drives off $CO_2$, which passes through the cover to atmosphere. Water and odorous compounds are selectively retained beneath the cover where the water contributes to efficient composting. And the odorous compounds are destroyed by the on-going composting process.

The fabric covers, while cost competitive with other enclosure systems, are often expensive and are typically required to meet air permeability and minimal tear-strength, puncture-resistance, and UV resistance characteristics.

When deployed, the covers are exposed to the elements. And the greatest physical threat to a properly fabricated cover is wind dislocation after deployment. In addition, excessive blower discharge through the air plenum can exceed the air permeability of the cover, resulting in excess odorous air escape beneath the perimeter of the deployed cover. To combat these two issues, cover manufacturers have developed cover anchorage schemes.

For example, in order to anchor a compost cover, manufacturers and composting facilities (1) use a continuous flexible hose (4-6 inch diameter), typically filled with water, sand, or other heavy material, around the cover perimeter, (2) use continuous, joined, heavy steel pipe sections around the cover perimeter, (3) place heavy feedstock, finished product, soil, or other aggregate material continuously around the cover perimeter, (4) place concrete parking stops intermittently around the cover perimeter, or (5) place "super sack" bags of feedstock or finished product, intermittently around the cover perimeter.

All of the foregoing anchorage schemes rely on the weight or mass of the anchorage system around the cover perimeter to hold the cover in position and to seal the perimeter from air escape. Such strategies must employ either heavy equipment or multiple personnel, or both to effectively place and remove the anchorage system because the components of the foregoing anchorage systems are often too bulky or heavy for one person to move. And those strategies using water as the mass are subject to leaking and, in cold climates, freezing. The anchorage schemes using loose aggregate materials require cleanup sweeping upon removal. And all the "heavy mass" anchorage strategies risk damage to the cover during placement and removal.

Another anchorage scheme that has been employed is the use of a net "webbing" over the entire pile, which is anchored to the ground around the perimeter of the pile. However, this type of scheme involves intermittent anchor placement, which may result in gaps to the sealing of the cover perimeter, allowing odorous air to escape under excess blower discharge conditions.

Since compost covers started to be used, over a decade ago, compost cover anchorage, or tie-down, systems have failed to provide methods and systems for securing compost covers to prevent the release of odorous compounds without the use for heavy-weight components.

BRIEF SUMMARY OF THE INVENTION

Compost cover tie-down systems, their components, and methods for employing the compost cover tie-down systems that provide an efficient solution to holding down a compost cover are herein disclosed.

In one embodiment, a compost cover tie-down system includes a perimeter element configured to hold a perimeter of a compost cover against a surface, a first strut and a second strut having perimeter engagement portions, and lash engagement portions. The compost cover tie-down system also includes a lash having a first end and a second end, the first end of the lash secured to the surface by a first anchor, and the second end of the lash secured to the surface by a second anchor, wherein the lash engages the lash engagement portions of the first strut and the second strut. The first strut and the second strut are configured to apply a force to the perimeter element when the lash applies a force to the lash engagement portions of the first strut and the second strut, the force applied to the perimeter element aiding in holding the perimeter of the compost cover against the surface.

Embodiments for struts are also disclosed. In one embodiment a strut includes a base member, a height member, and a cross-member. The base member is coupled to the height member and the cross member, the height member is coupled to the base member and the cross member, and the cross member is coupled to the height member and the base member. The strut further includes a perimeter engagement portion coupled to the cross member and the base member, which perimeter engagement portion is configured to engage a perimeter element of a compost cover tie-down system. The strut also includes a lash engagement portion coupled to the cross member and the height member, and the lash engagement portion is configured to engage a lash of a compost cover tie-down system. The strut applies a force to the perimeter element of the compost cover tie-down system when the lash of the compost cover tie-down system applies a force to the lash engagement portion of the strut.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Exemplary embodiments of compost cover tie-down systems and components and methods for using the same will now be described with reference to the Figures. The illustrated and described embodiments are exemplary only, and one of skill in the art will recognize many variations of the described embodiments with the scope of the claims.

Figure 1:
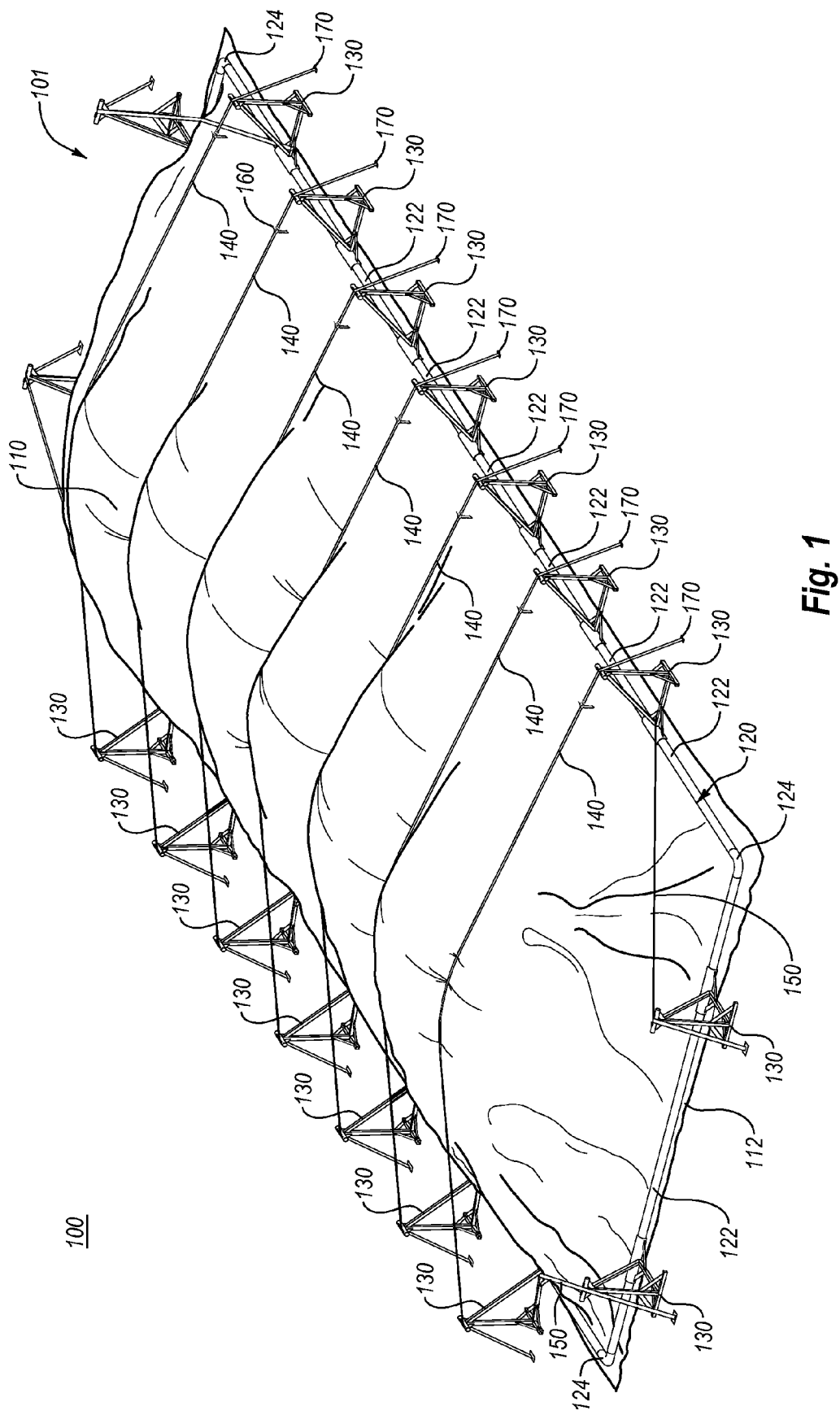
FIG. 1 illustrates one embodiment of a compost cover tie-down system.

Referring first to FIG. 1, FIG. 1 shows one embodiment of a compost cover tie-down system 100, which is shown deployed around a compost pile 101. As shown in FIG. 1, compost cover tie-down system 100 includes a compost cover 110, a perimeter element 120, struts 130, lashes 140, cross-lashes 150, ratchet tension assemblies 160, and ground-anchors 170.

In FIG. 1, compost pile 101 is piled on the ground, and compost cover 110 covers the entirety of compost pile 101. Compost cover 110 is sheet of selectively porous laminate textile fabric, such as GORETEX® available from W. L. Gore & Associates, Inc., a Delaware corporation with headquarters at 555 Paper Mill Road, Newark, Del. 19711. Compost cover 110 completely covers compost pile 101 such that a perimeter 112 of compost cover 110 extends along the ground beyond the edge of compost pile 101.

Perimeter element 120 is placed around the section of compost cover 110 that extends along the ground beyond the edge of compost pile 101. As shown perimeter element 120 is a pipe constructed of extension sections 122 and corner sections 124. The extensions section 122 and corner section 124 of perimeter element 120 are assembled so that perimeter element 120 follows the general shape and size of compost cover 110 and compost pile 101.

One of skill in the art will recognize a wide variety of materials from which to make a perimeter element. For example, in one embodiment a perimeter element is assembled from 4 inch to 6 inch aluminum irrigation pipe, and prefabricated 40-foot sections of irrigation pipe and 90 degree corner elbow couplings may be used. In some embodiments, light-weight materials, such as, for example, aluminum, PVC, or plastic may be used to make a perimeter element so that perimeter element 120 may be easily moved and deployed by a single user. Moreover, a perimeter element need not be entirely continuous. For example, in on embodiment, multiple discontinuous sections of pipe may be used for a perimeter element, which still allow for a compost cover to be secured to the ground around a compost pile in order to prevent the escape of odorous compounds from the compost cover. In other embodiments, in which the escape of odorous compounds is not an issue, a perimeter element may be made from discontinuous materials that are configured to simply tie-down a compost cover.

Struts 130 of compost cover hold-down system 100 engage and exert a force on perimeter element 120 so that perimeter element 120 is forced against the ground to aid in the holding-down of compost cover 110 to create a seal around compost pile 101. Struts 130 also engage lashes 140 of compost cover tie-down system 100. In some embodiments struts 130 are made from light-weight materials such as aluminum, PVC, or plastic so that struts 130 may be easily moved and deployed by a single user. The structure and operation of struts for use with a compost cover tie-down system will be further explained with reference to FIGS. 2-7.

Lashes 140 extend across compost cover 110 and attach to the ground via ground anchors 170. Lashes 140 also engage struts 130 and, when tightened or under tension, exert a downward force on struts 130, which in turn exerts a force on perimeter element 120. In the embodiment of FIG. 1, lashes 140 are nylon straps which may be tightened with ratchet tension assemblies 160, which are well known in the art. In other embodiments lashes for use with a compost cover tie-down system may be straps, chains, cables, ropes, or other such materials known to those of skill in the art. Hooks, carabineers, or other devices may also be employed as part of the lashes for a compost cover-tie-down system as needed in order to aid in securing the lashes to ground anchors, to struts, or to other lashes. On the ends of compost pile 101, cross-lashes 150 may be used to tie struts 150 to each other as desired.

Ground anchors for use with a compost cover tie-down system may be any ground anchor mechanism or system known in the art. For example, ground anchors 170 of FIG. 1 are anchors secured in concrete to which lashes 140 attach. In some embodiments ground anchors may comprise climbing-type anchors, often used for rock climbing, in which anchors may be placed into a hole cored into an existing concrete section. In other embodiments, ground anchors may be stakes, which are driven into the ground.

Struts 130 and lashes 140 may be spaced along perimeter element 120 at any desired interval. For example, 10-40 feet may separate each strut 130 on one side of compost pile 101. The interval at which struts are placed around a compost pile may vary according to the required hold-down force of a compost cover tie-down system, for example, because of resident weather conditions, compost conditions, or because of other reasons.

One of skill in the art will recognize many other variations of the components for use with a compost cover tie-down system. For example, the extension sections of a perimeter element may be assembled from telescoping pipes, wherein a smaller diameter pipe is placed inside a larger diameter pipe, so that the perimeter element may be custom sized to exactly fit around a compost cover and compost pile. One of skill in the art will also recognize a variety of light-weight materials for struts and perimeter elements which provide a balance of light-weight and structural support for the struts and perimeter elements depending upon the desired application.

Compost cover tie-down system 100 may be used with any shape and size of a compost pile. For example, compost pile 101 is an exemplary compost pile that may be about 100-150 feet long, 20-30 feet wide, and 6-12 feet high. Thus, compost pile 101 has a substantially rectangular footprint. However, one of skill in the art will recognize that the disclosed compost-cover tie-down systems may also be used with compost piles and compost covers that are square, circular, elliptical, or any other symmetrical or asymmetrical shape.

Figure 2:
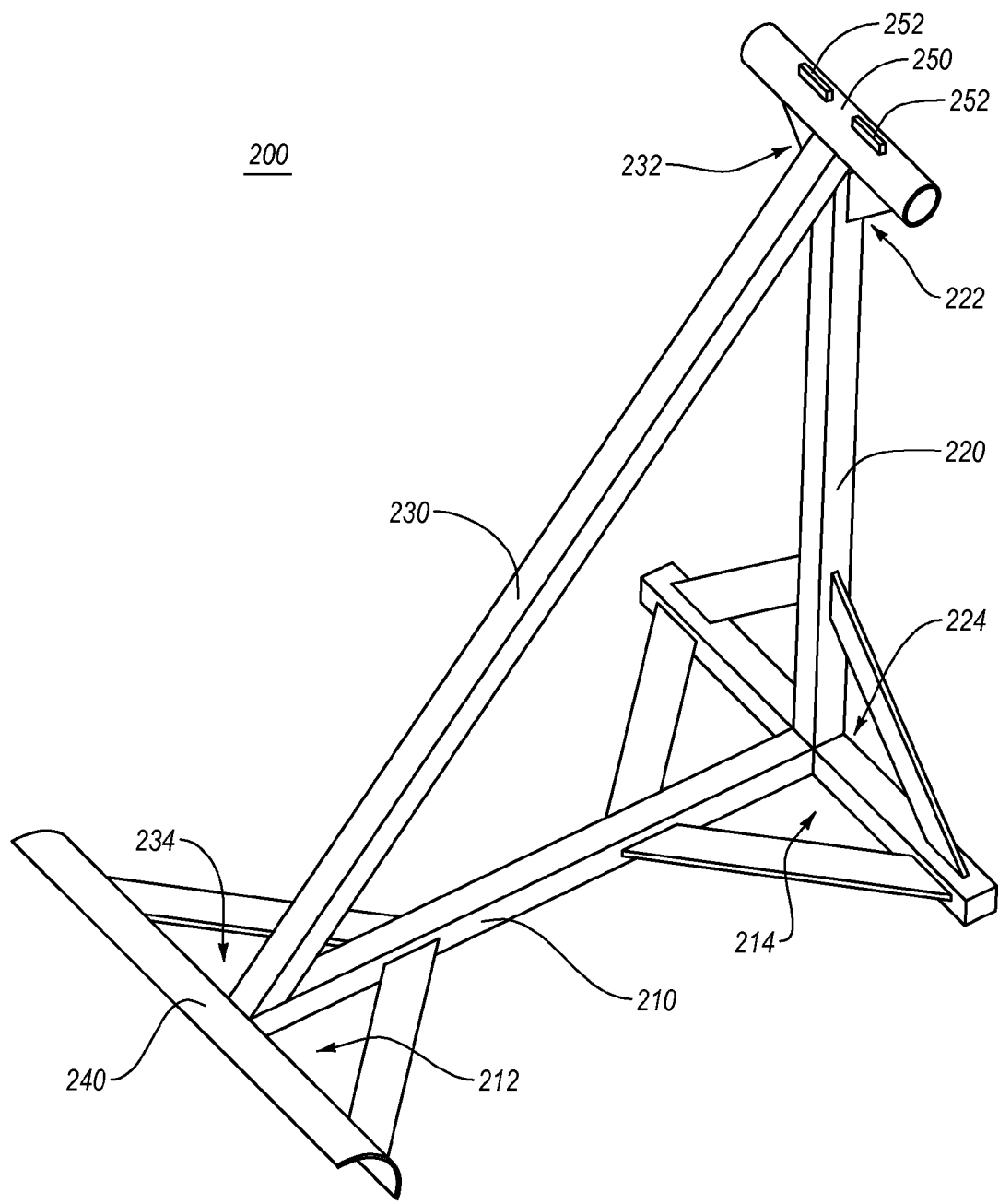
FIG. 2 is a perspective view of one embodiment of a strut for use with a compost cover tie-down system.

Referring now to FIG. 2, FIG. 2 shows one embodiment of a strut 200 for use with a compost cover tie-down system. Strut 200 includes a base member 210, a height member 220, a cross member 230, a perimeter engagement portion 240, and a lash engagement portion 250. As shown in FIG. 2, base member 210 has an inner end 212 and an outer end 214. Height member 220 has an upper end 222 and a lower end 224. And cross member 230 has a first end 232 and a second end 234. Outer end 214 of base member 210 is coupled to lower end 224 of height member 220, inner end 212 of base member 210 is coupled to second end 234 of cross member 230, and upper end 222 of height member 220 is coupled to first end 232 of cross member 230 such that base member 210, height member 220, and cross member 230 form a triangular shape.

Perimeter engagement portion 240 is coupled to inner end 212 of base member 210 and to second end 234 of cross member 230. Perimeter engagement portion 240 is shown as having a rounded shape so as to complement and engage a rounded surface of a perimeter element, e.g., a pipe, of a compost cover tie-down system. In use, perimeter engagement portion 240 applies force to a perimeter element of a compost cover tie-down system so as to force the perimeter element against a compost cover to hold the compost cover in place.

Lash engagement portion 250 is coupled to the upper end 222 of height member 220 and to first end 232 of cross member 230. In use, lash engagement portion 250 engages a lash of a compost cover tie-down system. Lash engagement portion 250 is rounded to allow a lash to slide along lash engagement portion 250 as needed, although other shapes for a lash engagement portion may be desirable. Retainers 252 of lash engagement portion 250, although not strictly necessary, help to retain a lash on the lash engagement portion 250 while the strut 200 is in use. As will be further described with reference to FIGS. 7-8, when a lash of a compost cover tie-down system is tightened against lash engagement portion 250 of strut 200, a force from the tightened lash is transferred to perimeter engagement portion 240 so that perimeter engagement portion 240 applies a force to a perimeter element of the compost cover tie-down system.

Figure 3:
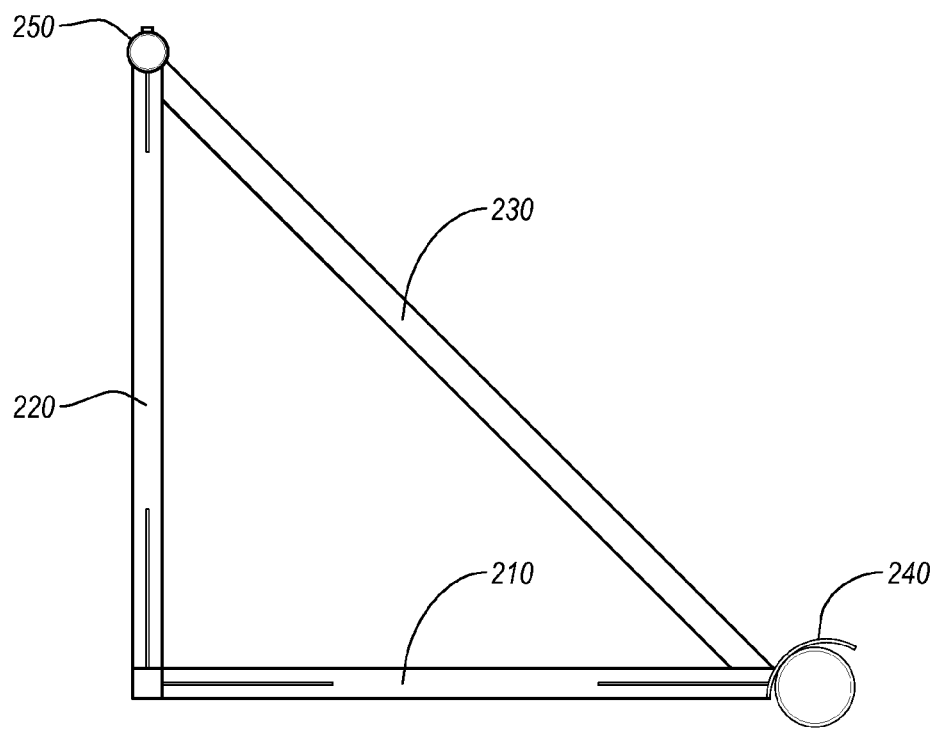
FIG. 3 is a side-view of the embodiment of the strut of FIG. 2.
Figure 4:
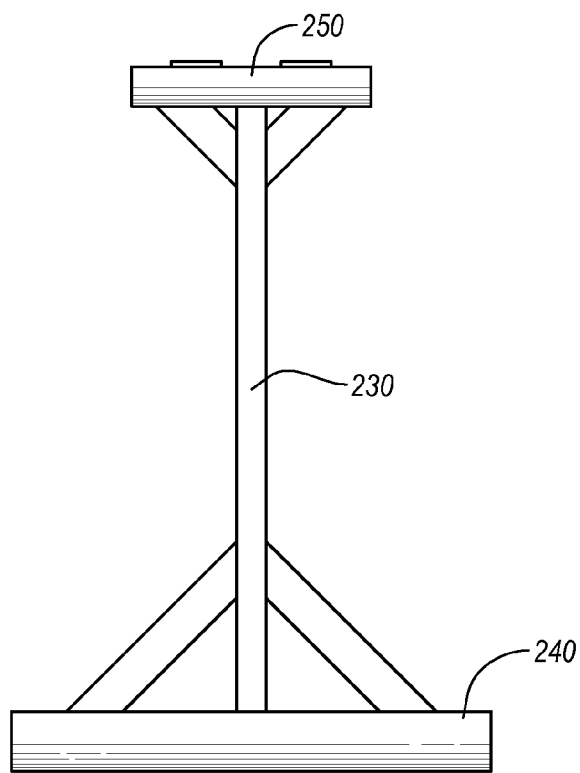
FIG. 4 is a front-view of the embodiment of the strut of FIG. 2.
Figure 5:
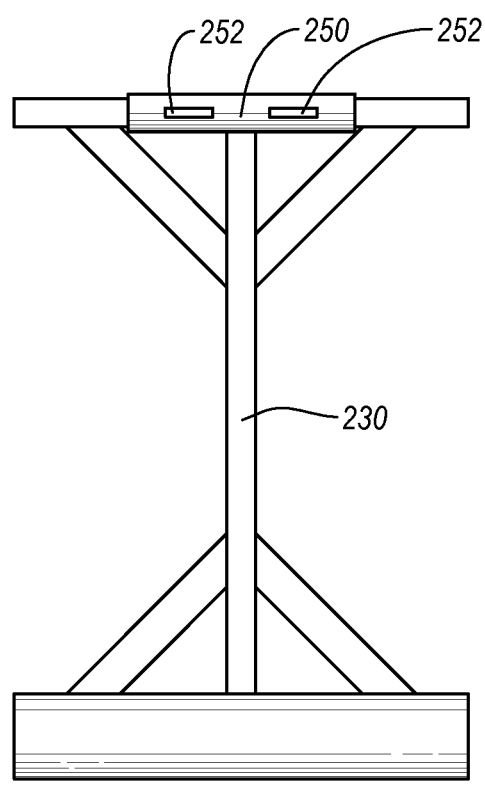
FIG. 5 is a top-view of the embodiment of the strut of FIG. 2.

FIGS. 3-5 show further views of strut 200. FIG. 3 is a side-view of strut 200, FIG. 4 is a front-view of strut 200, and FIG. 5 is a top-view of strut 200.

Figure 6A:
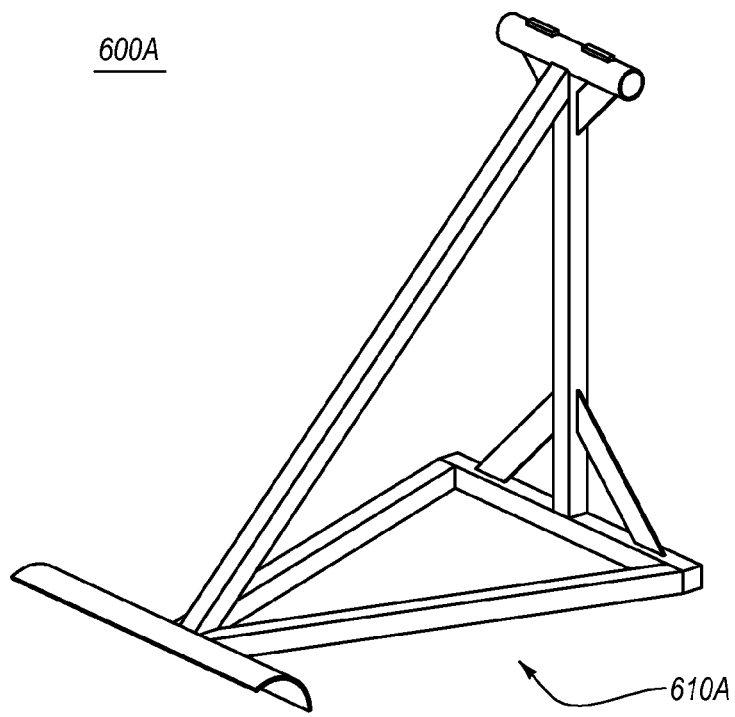
FIGS. 6A-6D illustrate other embodiments of struts for use with a compost cover tie-down system.
Figure 6B:
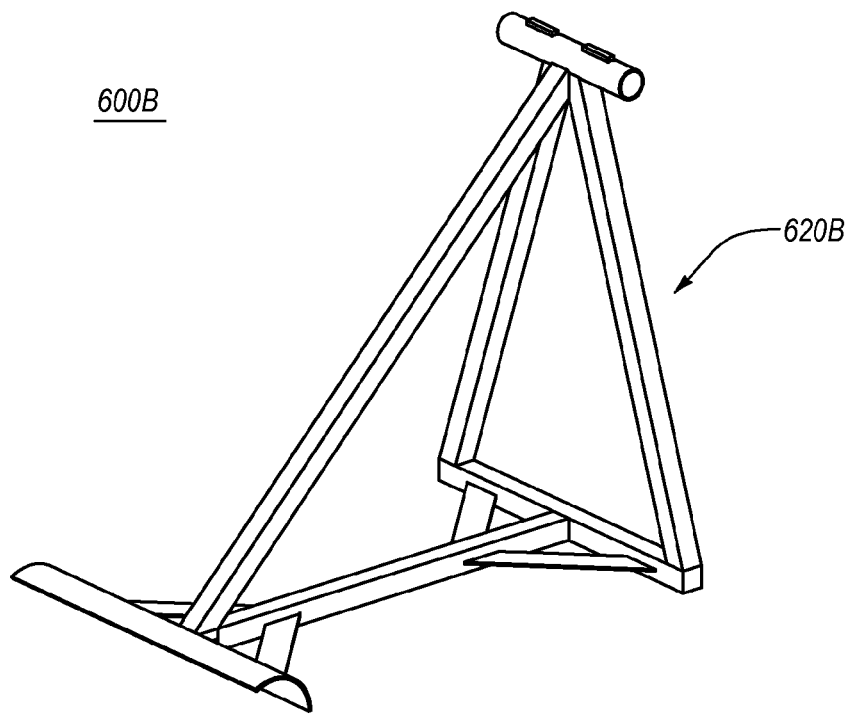
Figure 6C:
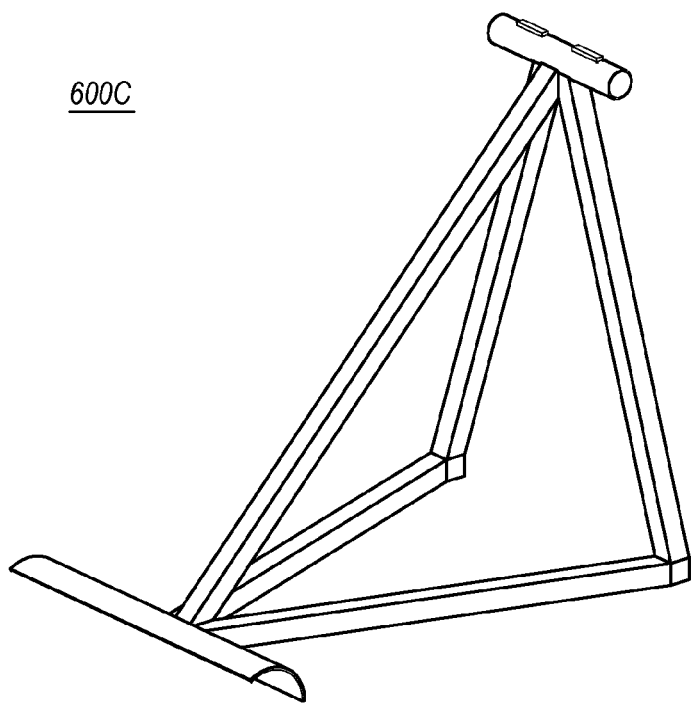
Figure 6D:
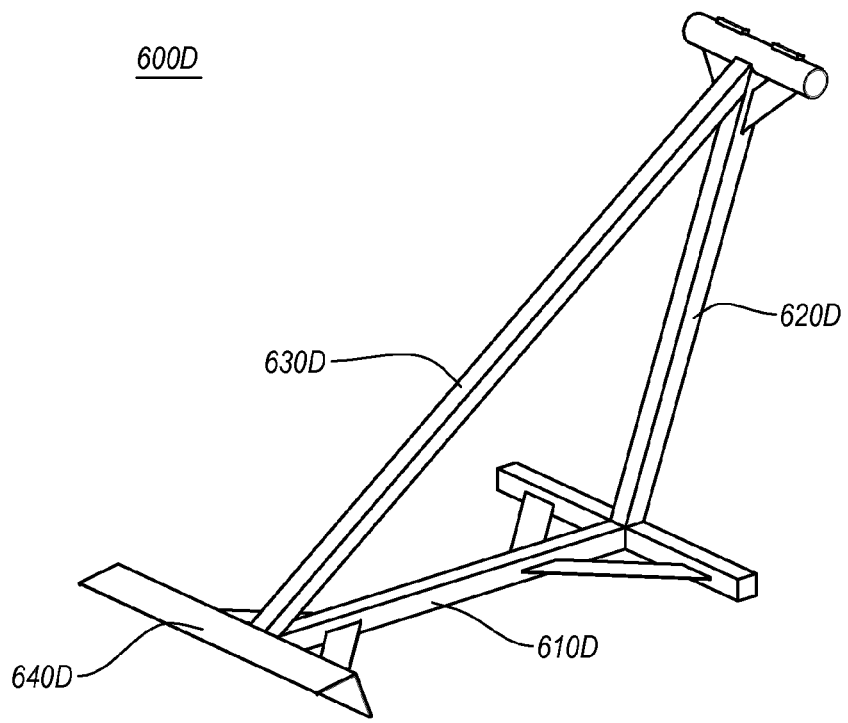

FIGS. 6A-6D show additional embodiment of struts for use with a compost cover tie-down system. FIG. 6A shows one embodiment of a strut 600A with a triangular base member 610A. FIG. 6B shows one embodiment of a strut 600B with a triangular height member 620B. FIG. 6C shows another embodiment of a strut 600C. And FIG. 6D shows one embodiment of strut 600D wherein perimeter engagement portion 640D is configured to engage an angular perimeter element of a compost cover tie-down system, and wherein base member 610D and height member 620D are coupled together at an obtuse angle.

The described struts may be constructed of a variety of materials. In some embodiments, light-weight materials, such as aluminum, PVC, or plastic may be used to construct the described struts. In other embodiments, struts may be fabricated from tube and plate stock of uniform cross-sectional dimension in order to simplify production. Also, the individual components of struts may be coupled together by welding, by gluing, by bolting, or by any other method of coupling known in the art.

One of skill in the art will recognize many other embodiments for struts for use with a compost cover tie-down system. For example, perimeter engagement portions may be configured in a variety of shapes to complement and engage a perimeter element of a compost cover tie-down system. Moreover, the particular shapes and sizes of components, such as base members, height members, cross members, perimeter engagement portions, and lash engagement portions, from which a strut may be constructed are variable. In some embodiments, additional structural components such as a strain gauge may be desirable in order to measure a force being applied to a perimeter element. Thus the few disclosed embodiments of struts for use with a compost cover tie-down system are in no way limiting of the appended claims.

Now that struts for use with a compost cover tie-down system have been described with reference to FIGS. 2-6D, compost cover tie-down system 100 of FIG. 1 will be further described with reference to FIG. 7, which is a cross-sectional view of compost cover tie-down system 100.

Figure 7:
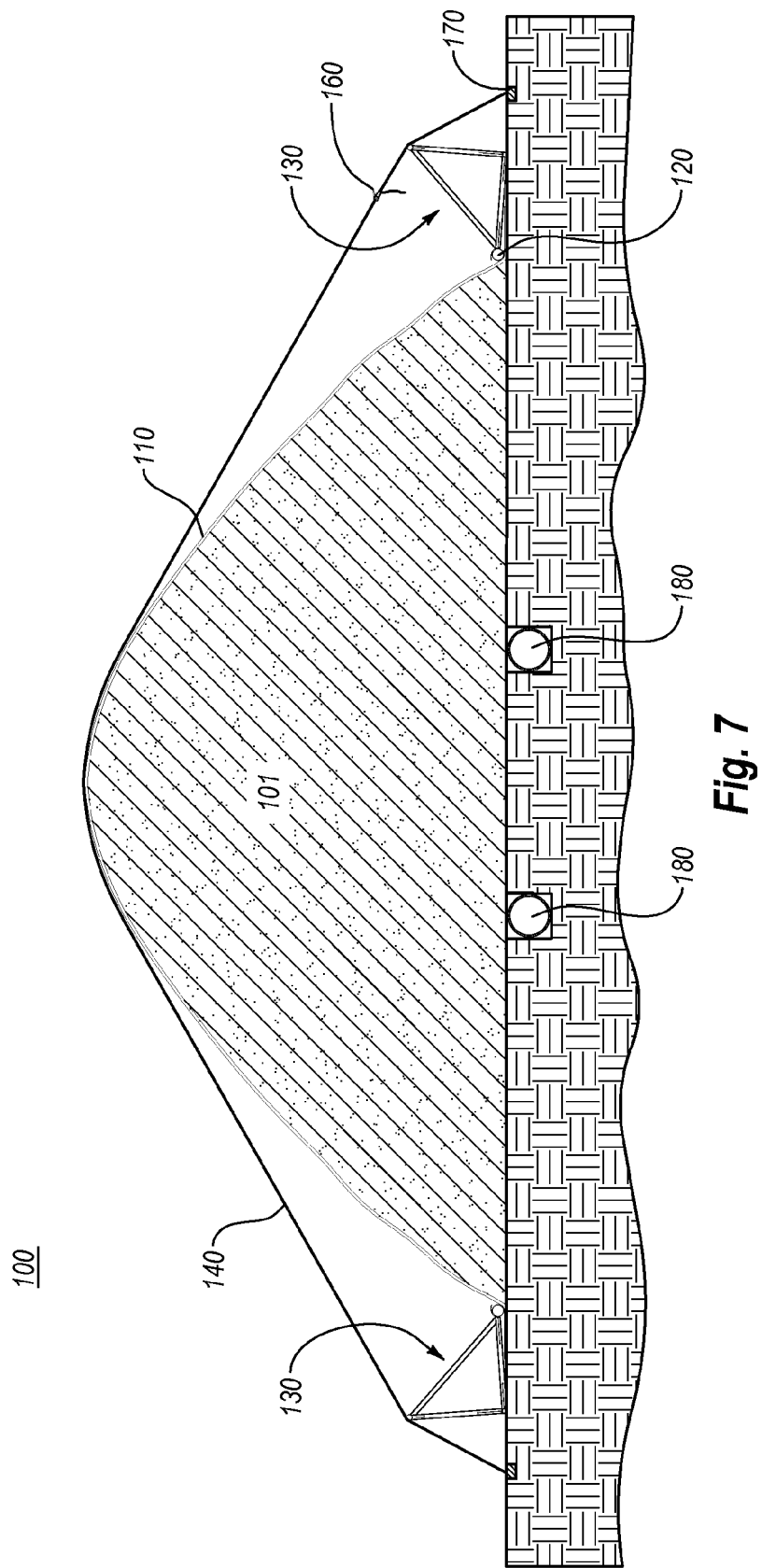
FIG. 7 is a cross-sectional view of the embodiment of a compost cover tie-down system of FIG. 1.

FIG. 7 further shows the operation of perimeter element 120, struts 130, lash 140, ratchet tension assembly 160, and ground anchor 170 to secure compost cover 110 over compost pile 101. As shown ratchet tension assembly 160 may be used to tighten lash 140, which will apply a force to the lash engagement portions of struts 130. Struts 130 will thereby apply a force to the perimeter element 120, which will force perimeter element 120 against the ground to hold down and seal compost cover 110 against the ground.

Forces other than the tightening of lash 140 via ratchet tension assembly 160 may also cause lash 140 to apply a force to struts 130. For example, wind or other elemental forces may cause compost cover 110 to lift off of compost pile 101. The lifting of compost cover 110 against lash 140 will cause lash 140 to apply force to perimeter element 120 through struts 130, which will resist the lifting of compost cover 110. Additionally, plenums 180 below compost pile 101, which blow air or otherwise allow air to circulate around compost pile 101 below compost cover 110 may cause compost cover 110 to partially inflate. Such inflation may cause compost cover 110 to lift off of compost pile 101. However, the lifting of compost cover 110 will also cause a force to be applied to lash 140, which will cause lash 140 to apply a force to perimeter element 120 through struts 130, which will further strengthen the hold and seal of compost cover 110 against the ground by perimeter element 120.

Figure 8:
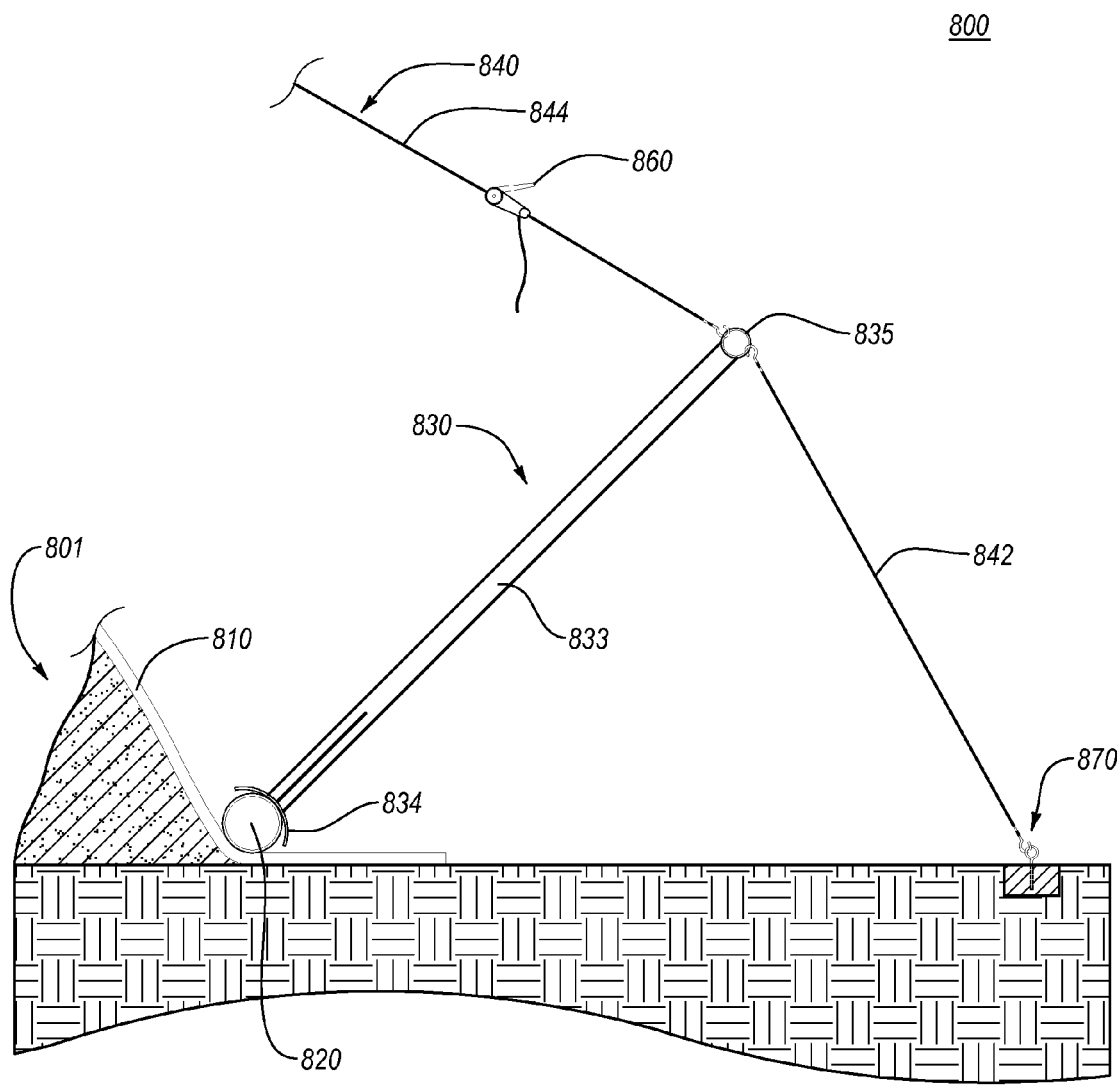
FIG. 8 is another embodiment of a strut for use with a compost cover tie-down system.

Another embodiment of a compost cover tie down system 800 will now be described with reference to FIG. 8. FIG. 8 is only a partial, side view of compost cover tie down system 800 showing the operation of a strut 830 and a lash 840, which apply force to a perimeter element 820 to hold down compost cover 810 over compost pile 801.

As shown in FIG. 8, strut 830 is comprised of cross member 833, perimeter engagement portion 834, and lash engagement portion 835. Thus, unlike strut 200 of FIG. 2, strut 830 has no base member or height member. A lower portion 842 of lash 840 is coupled to a ground anchor 870 and to lash engagement portion 835 of strut 830. Upper section 844 of lash 840 is also coupled to lash engagement portion 835 of strut 830.

Thus, one of skill in the art will appreciate that a lash for use with a compost cover tie-down system may be comprised of multiple lashes and will appreciate that struts for use with compost cover tie-down systems may be comprised of a single cross member. Alternatively, the lower portion 842 of lash 840 may be described as both part of the lash 840 of the compost cover tie-down system 800 and as part of the strut 830, i.e., a height member of strut 830. As such, in some embodiments of a compost cover-tie down system, it may be that the struts are secured to the ground using anchors or other methods instead of the lashes and that the lashes couple to or engage only the struts.

One of skill in the art will also recognize that the systems and methods for securing a cover as taught herein may also be applied to the securing of covers for other purposes besides covering compost, such as for tent covers, tuck bed covers, covers for building materials, or for other situations in which a user desires to cover materials with a fabric or fabric-type cover.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A compost cover tie-down system for securing a compost cover against a surface, the compost cover tie-down system comprising:

a rigid perimeter element configured to hold at least a section of the compost cover against the surface; and a plurality of struts, each of the plurality of struts having a perimeter engagement portion and a lash engagement portion, wherein the perimeter engagement portion of each of the plurality of struts directly engages the rigid perimeter element to provide a securing force to the rigid perimeter element, and wherein the lash engagement portion engages a lash of the compost cover tie-down system;

the lash of the compost cover tie-down system comprises a first end and a second end, the first end of the lash secured to the surface by a first anchor, and the second end of the lash secured to the surface by a second anchor, wherein the lash engages a lash engagement portion of at least one strut of the plurality of struts;

the at least one strut of the plurality of struts is configured such that the at least one strut applies a force to the rigid perimeter element when the lash applies a force to the lash engagement portion of the at least one strut, the force applied to the rigid perimeter element aiding to hold the section of the compost cover against the surface.

2. The compost cover tie-down system as recited in claim 1, wherein the rigid perimeter element is continuous.

3. The compost cover tie-down system as recited in claim 1 further comprising a ratchet tension assembly configured to aid a user in applying tension to the lash.

4. The compost cover tie-down system as recited in claim 1, wherein the rigid perimeter element is comprised of a pipe.

5. The compost cover tie-down system as recited in claim 1, wherein the rigid perimeter element is hollow and unfilled while in use to secure the compost cover against the surface.

6. The compost cover tie-down system as recited in claim 1, wherein the rigid perimeter element is formed from aluminum, PVC, or plastic.

7. The compost cover tie-down system as recited in claim 1 wherein the plurality of struts are formed from aluminum, PVC, or plastic.

8. The compost cover tie-down system as recited in claim 1, wherein the rigid perimeter element is substantially rectangular in shape.

* * * * *